US012687254B2

(12) United States Patent
Li et al.

(10) Patent No.: US 12,687,254 B2
(45) Date of Patent: Jul. 21, 2026

(54) GIMBAL DEVICE

(71) Applicant: AAC ACOUSTIC TECHNOLOGIES (SHENZHEN) CO., LTD., Shenzhen (CN)

(72) Inventors: Songtao Li, Shenzhen (CN); Junhao Yuan, Shenzhen (CN); Hongyan Tao, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 114 days.

(21) Appl. No.: 18/637,441

(22) Filed: Apr. 16, 2024

(65) Prior Publication Data

US 2025/0164063 A1     May 22, 2025

Related U.S. Application Data

(63) Continuation of application No. PCT/CN2023/133309, filed on Nov. 22, 2023.

(51) Int. Cl.
| | |
|---|---|
| *F16M 11/12* | (2006.01) |
| *F16M 11/18* | (2006.01) |
| *F16M 11/20* | (2006.01) |
| *F16M 11/24* | (2006.01) |

(52) U.S. Cl.
CPC ........... *F16M 11/128* (2013.01); *F16M 11/18* (2013.01); *F16M 11/2021* (2013.01); *F16M 11/24* (2013.01)

(58) Field of Classification Search
CPC .... F16M 11/123; F16M 11/128; F16M 11/18; F16M 11/2021; F16M 11/24; F16G 1/28; F16H 1/00
USPC .......... 248/121, 122.1, 125.9, 349.1, 346.06, 248/274.1, 276.1, 282.1, 284.1, 289.11, 248/291.1, 178.1, 183.3, 186.2
See application file for complete search history.

(56) References Cited

U.S. PATENT DOCUMENTS

2012/0124600 A1* 5/2012 Okuyama ............ G11B 17/051
720/620

* cited by examiner

*Primary Examiner* — Alfred J Wujciak
(74) *Attorney, Agent, or Firm* — Wiersch Law Group

(57) ABSTRACT

A gimbal device includes a lifting module, a horizontal rotating module, a rotating shaft, a pitch module, and a swing module, the lifting module includes a driving piece, a transmission worm, and a gear rack, the horizontal rotating module includes a driving piece, a first synchronous pulley, and a bearing assembly, the first synchronous pulley drives the bearing assembly to rotate, the rotating shaft is connected with the bearing assembly, the pitch module includes a driving piece, a first transmission gear, and a fixed gear, the third driving piece rotates around the fixed gear, the swing module includes a driving piece, a second transmission gear, a swing gear, and a swing housing, the swing housing rotates around the swing gear. The gimbal device is capable of performing four-axis motion, and modules of the gimbal device are disposed compactly, the four-axis motion is realized in a small space.

10 Claims, 4 Drawing Sheets

100

14

13

15

12

11

GIMBAL DEVICE

TECHNICAL FIELD

The present disclosure relates to a field of gimbal technologies, and in particular to a gimbal device.

BACKGROUND

A gimbal device is an apparatus for stably controlling postures of a target device, and the gimbal device is configured to fix the target device. That is, the gimbal device is capable of keeping the target device in a stationary posture during movement of the gimbal device, or the gimbal device may serve as an internal structure of the target device. For example, the gimbal device may be disposed in a video recording device to adjust a video recording angle thereof. During an adjusting process, the gimbal device needs to continuously perform multi-angle and multi-direction adjustments to ensure that the target device keeps the stationary posture. However, conventional gimbal devices are only allowed to perform two-axis motion of horizontal rotation and pitch rotation, which have few motion forms, and cannot meet multi-angle and multi-direction adjustment requirements. Moreover, an operation angle of the horizontal rotation of the conventional gimbal devices is limited, and users need to adjust the target device relying on their own motion, so that the conventional gimbal devices are not convenient enough to use.

SUMMARY

The present disclosure provides a gimbal device, which is capable of realizing multi-angle and multi-direction adjustments, and improves user experience.

The present disclosure provides the gimbal device. The gimbal device includes a lifting module, a horizontal rotating module, a rotating shaft, a pitch module; and a swing module.

The lifting module includes a first driving piece, a transmission worm connected with an output end of the first driving piece, and a gear rack disposed in a vertical direction. The transmission worm is in transmission connection with the gear rack to drive the gear rack to move in the vertical direction.

The horizontal rotating module is fixedly connected with the gear rack, the horizontal rotating module includes a second driving piece, a first synchronous pulley connected with an output end of the second driving piece, and a bearing assembly, an axial direction of the bearing assembly is parallel to the vertical direction, and the first synchronous pulley is in transmission connection with the bearing assembly to drive the bearing assembly to rotate in a horizontal direction.

The rotating shaft is connected with the bearing assembly in the vertical direction, the pitch module and the swing module are disposed at an end portion of the rotating shaft.

The pitch module includes a third driving piece, a first transmission gear connected with an output end of the third driving piece, and a fixed gear in transmission connection with the first transmission gear, an axis of the first transmission gear is parallel to a first direction, and the fixed gear is fixedly connected with the rotating shaft, so that the third driving piece is rotatable around an axial direction of the fixed gear.

The swing module includes a fourth driving piece, a second transmission gear connected with an output end of the fourth driving piece, a swing gear in transmission connection with the second transmission gear, and a swing housing connected with the swing gear, an axis of the second transmission gear is parallel to a second direction, and the fourth driving piece drives the swing housing to rotate around an axial direction of the swing gear.

In one optional embodiment, the lifting module further includes a transmission assembly, and the transmission worm is in transmission connection with the gear rack through the transmission assembly.

In one optional embodiment, the transmission assembly includes a third transmission gear and a fourth transmission gear, and the third transmission gear and the fourth transmission gear rotate synchronously, the third transmission gear is in transmission connection with the transmission worm, and the fourth transmission gear is in transmission connection with the gear rack, so that the first driving piece drives the gear rack to move in the vertical direction.

In one optional embodiment, the lifting module further includes a sensing assembly, the sensing assembly includes a photoelectric sensor and light shielding sheets, the light shielding sheets are respectively disposed at two ends of the gear rack, and when the gear rack moves in the vertical direction, the light shielding sheets are in inductive connection with the photoelectric sensor.

In one optional embodiment, the bearing assembly includes a first bearing, a second bearing, and a second synchronous pulley, at least a part of the second bearing is connected with the second synchronous pulley, at least a part of the first bearing is connected with the second bearing, and the second synchronous pulley is connected with the first synchronous pulley through a synchronous belt.

In one optional embodiment, the gimbal device further includes a first bracket and a second bracket, the first bracket and the second bracket are oppositely disposed at an end portion of the rotating shaft in the first direction, at least one of the first bracket and the second bracket defines a mounting hole, and the fixed gear is disposed in the mounting hole.

In one optional embodiment, the pitch module further includes a mounting housing, the third driving piece is disposed in the mounting housing, the first transmission gear is disposed outside the mounting housing, and the first transmission gear is in transmission connection with the fixed gear, so that the third driving piece in the mounting housing is rotatable around an axis of the mounting hole.

In one optional embodiment, the first driving piece, the second driving piece, the third driving piece, and the fourth driving piece are hybrid step motors.

In one optional embodiment, the gimbal device includes a protective housing, shock absorbing silicone structures are disposed between the first driving piece and the protective housing, between the second driving piece and the protective housing, between the third driving piece and the protective housing, and between the fourth driving piece and the protective housing.

In one optional embodiment, magnetic detection pieces are disposed on the horizontal rotating module, the pitch module, and the swing module.

In one optional embodiment, the gimbal device further includes a control module, the control module includes a main control board and a driving board, the main control board is electrically connected with the driving board, and the driving board is electrically connected with the first driving piece, the second driving piece, the third driving piece, and the fourth driving piece.

In one optional embodiment, the gimbal device includes at least one of following features:

(1) a lifting distance of the lifting module is 0-27 mm;

(2) a rotation angle of the horizontal rotating module is –180-180°;

(3) a rotation angle of the pitch module is 0-50°;

(4) a rotation angle of the swing module is –20-20°;

(5) operating speeds of the horizontal rotating module, the pitch module, and the swing module is adjustable in a range of 0-270°/s.

The gimbal device provided in the present disclosure is configured to fix a target device or serve as an internal support structure of the target device. The horizontal rotating module, the pitch module, and the swing module are all connected with the gear rack of the lifting module, and the gear rack is movable in the vertical direction. That is, the target device is movable in the vertical direction through the lifting module. The bearing assembly is engaged with the first synchronous pulley, enabling the bearing assembly being rotatable at a large angle, thus realizing a rotation of the target device in the horizontal direction through the horizontal rotating module. The axis of the first transmission gear of the pitch module is parallel to the first direction, so that when the third driving piece is driven, by arrangement of the fixed gear, the third driving piece is rotatable around the axial direction of the fixed gear (i.e., the third driving piece swings in a front-rear direction). That is, the target device is rotatable in the front-rear direction through the pitch module. The swing housing is connected with the fourth driving piece through the swing gear, so that when the fourth driving piece rotates, the swing housing rotates around the axial direction of the swing gear (i.e., the swing housing swings in a left-right direction). That is, the target device is rotatable in the left-right direction through the swing module.

Therefore, the gimbal device of the present disclosure is capable of performing four-axis motion, which enriches motion forms, is convenient to use, and improves user experience. Meanwhile, the lifting module, the horizontal rotating module, the pitch module, and the swing module are disposed compactly, and do not affect each other during a working process, so that the four-axis motion of the gimbal device is realized in a small space and the gimbal device satisfies small volume requirements in multiple fields.

Figure 1:
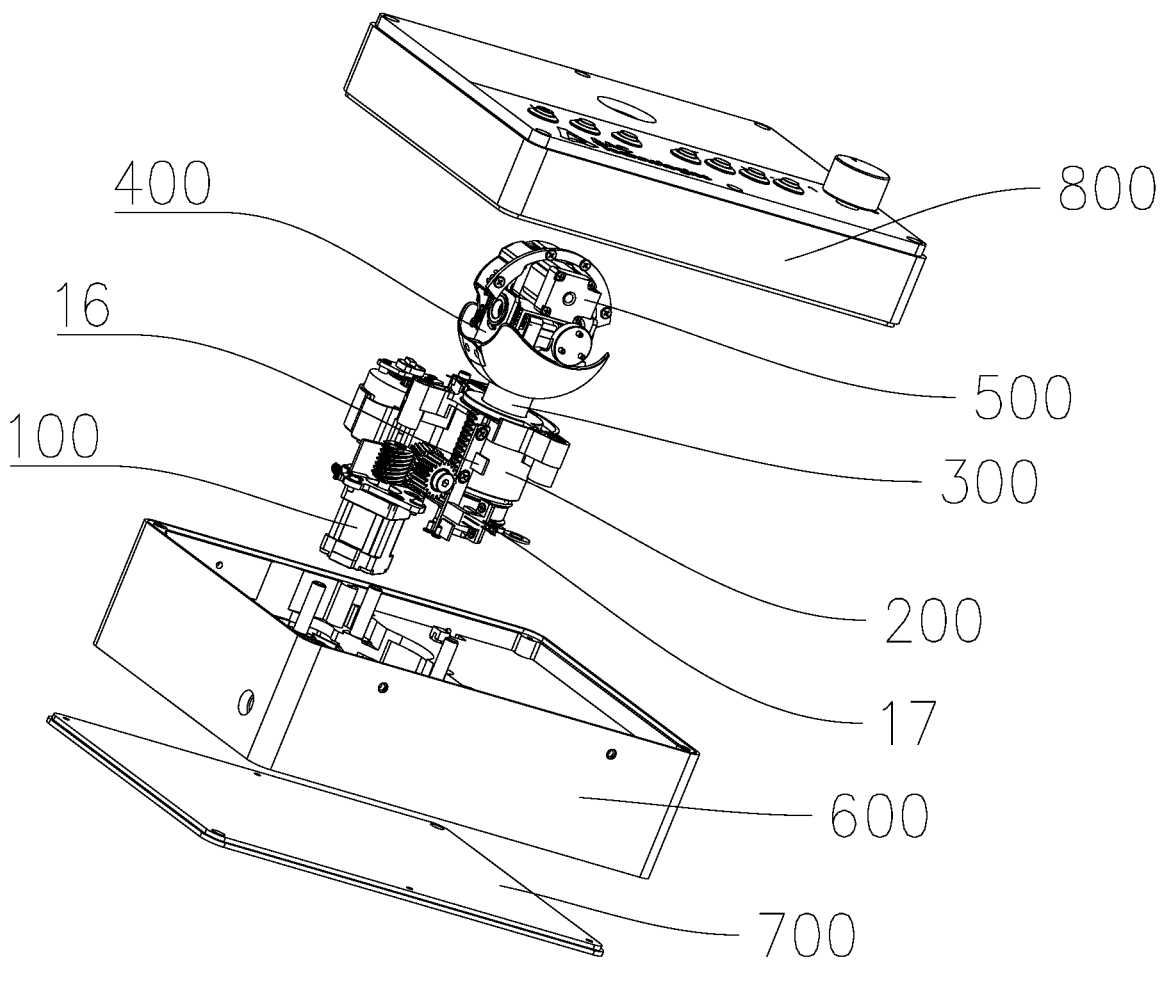
FIG. 1 is a schematic structural diagram of a gimbal device of the present disclosure.

Reference numerals in the drawings: 100 lifting module; 11. first driving piece; 12. transmission worm; 13. gear rack; 14. third transmission gear; 15. fourth transmission gear; 16. light shielding sheet; 17. photoelectric sensor; 200. horizontal rotating module; 21. second driving piece; 22. first synchronous pulley; 231. first bearing; 232. second bearing; 233. synchronous belt; 234. second synchronous pulley; 300. rotating shaft; 301. first bracket; 302. second bracket; 31. third driving piece; 32. first transmission gear; 33. fixed gear; 34. mounting housing; 400. pitch module; 41. fourth driving piece; 42. second transmission gear; 43. swing gear;

44. swing housing; 500. swing module; 600. protective housing; 700. bottom plate; 800. top cover.

DETAILED DESCRIPTION

In order to facilitate understanding of the present disclosure, the following describes embodiments of the present disclosure in detail with reference to the accompanying drawings.

It should be noted that the embodiments in the following description are only some optional embodiments of the present disclosure. All other embodiments obtained by those skilled in the art without creative work are within the protection scope of the present disclosure.

It should be understood the terms used in the embodiments of the present disclosure are merely for a purpose of describing specific embodiments, and are not intended to limit the present disclosure. As used in the embodiments of the present disclosure and the appended claims, the singular forms "a" and "the" are also intended to include plural forms, unless the context clearly indicates other meanings.

It should be understood that the term "and/of" used herein is merely an association relationship describing associated objects, and indicates that there may be three relationships, for example, A and/or B may indicate that A exists alone, A and B exist simultaneously, and B exists alone. In addition, the character "/" in this specification generally indicates an "or" relationship between the associated objects.

It should be noted that the terms such as "upper", "lower", "left", and "right" described in the embodiments of the present disclosure are described by using angles shown in the accompanying drawings, and should not be understood as a limitation to the embodiments of the present disclosure. In addition, in the context, it should also be understood that when an element is lifted to "on" or "under" another element, it may not only be directly connected with "on" or "under" another element, or may be indirectly connected with "on" or "under" another element through an intermediate element.

A gimbal device is an apparatus for stably controlling postures of a target device, and the gimbal device is configured to fix the target device. That is, the gimbal device is capable of keeping the target device in a stationary posture during movement of the gimbal device, or the gimbal device may serve as an internal structure of the target device. For example, the gimbal device may be disposed in a video recording device to adjust a video recording angle thereof. During an adjusting process, the gimbal device needs to continuously perform multi-angle and multi-direction adjustments to ensure that the target device keeps the stationary posture. However, conventional gimbal devices are only allowed to perform two-axis motion of horizontal rotation and pitch rotation, which have few motion forms, and cannot meet multi-angle and multi-direction adjustment requirements. Moreover, an operation angle of the horizontal rotation of the conventional gimbal devices is limited, and users need to adjust the target device relying on their own motion, so that the conventional gimbal devices are not convenient enough to use.

Figure 2:
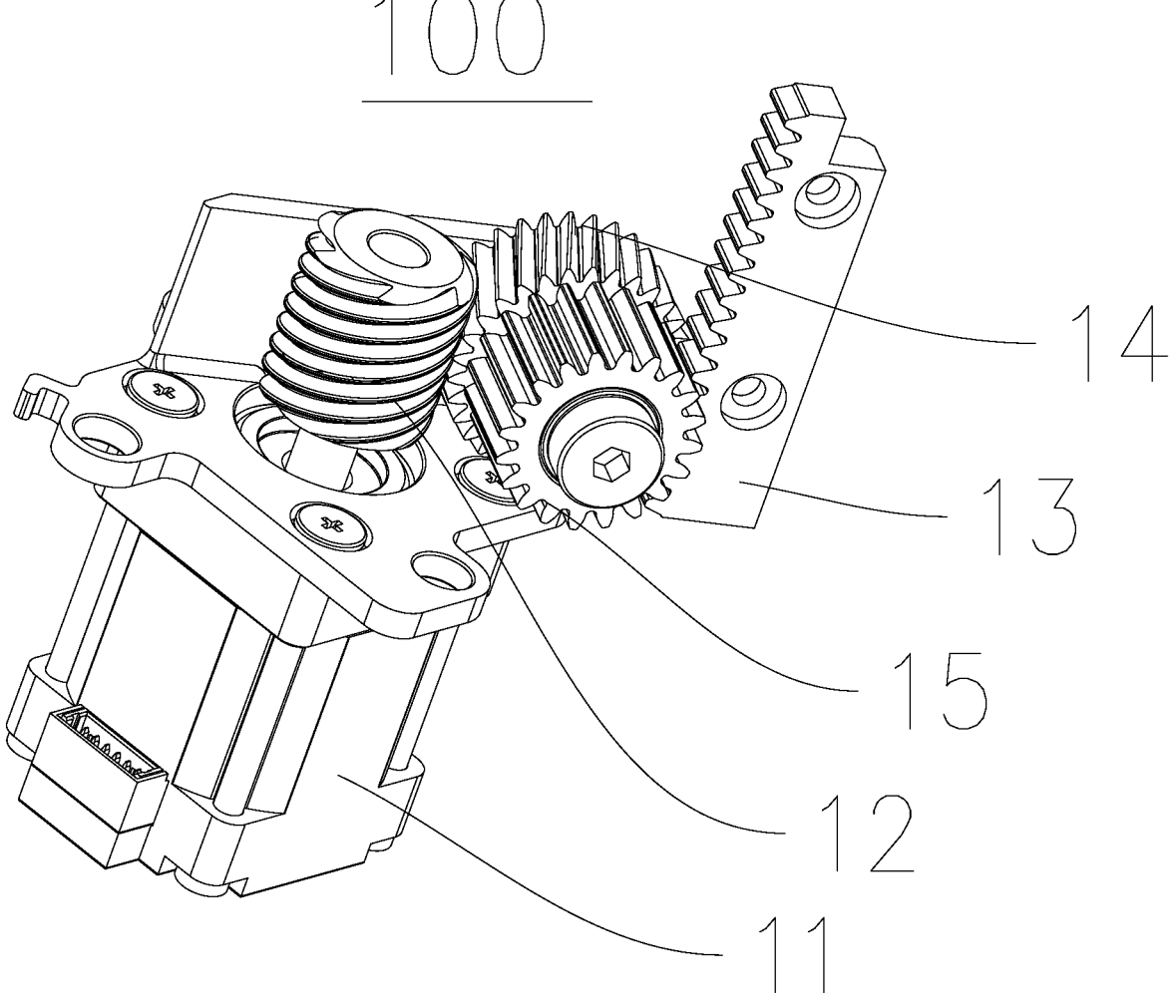
FIG. 2 is a schematic structural diagram of a lifting module of the gimbal device of the present disclosure.
Figure 3:
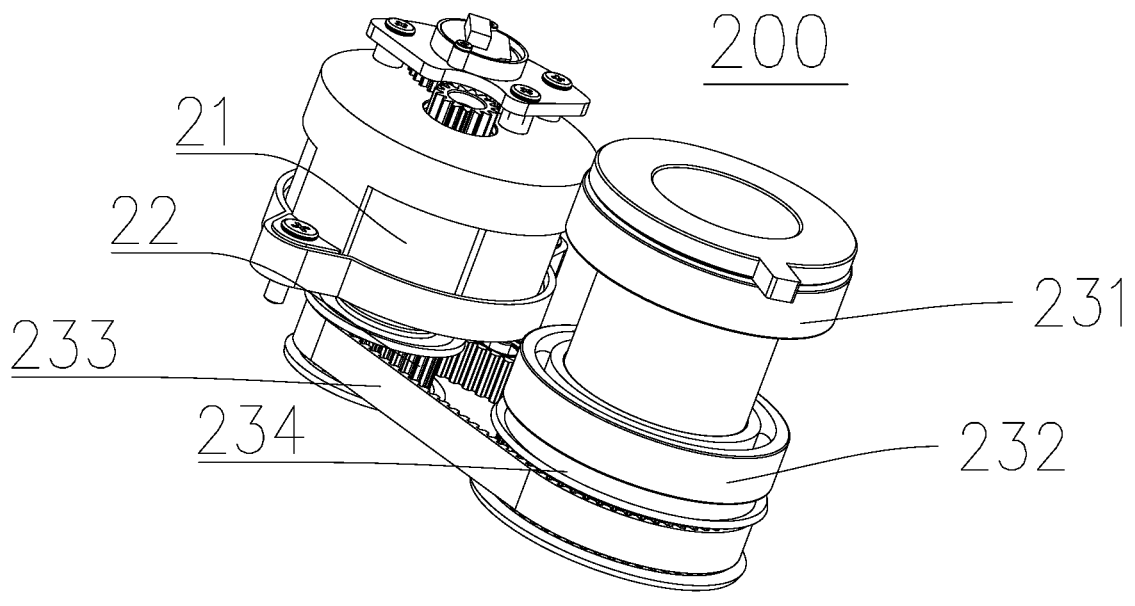
FIG. 3 is a schematic structural diagram of a horizontal rotating module of the gimbal device of the present disclosure.
Figure 4:
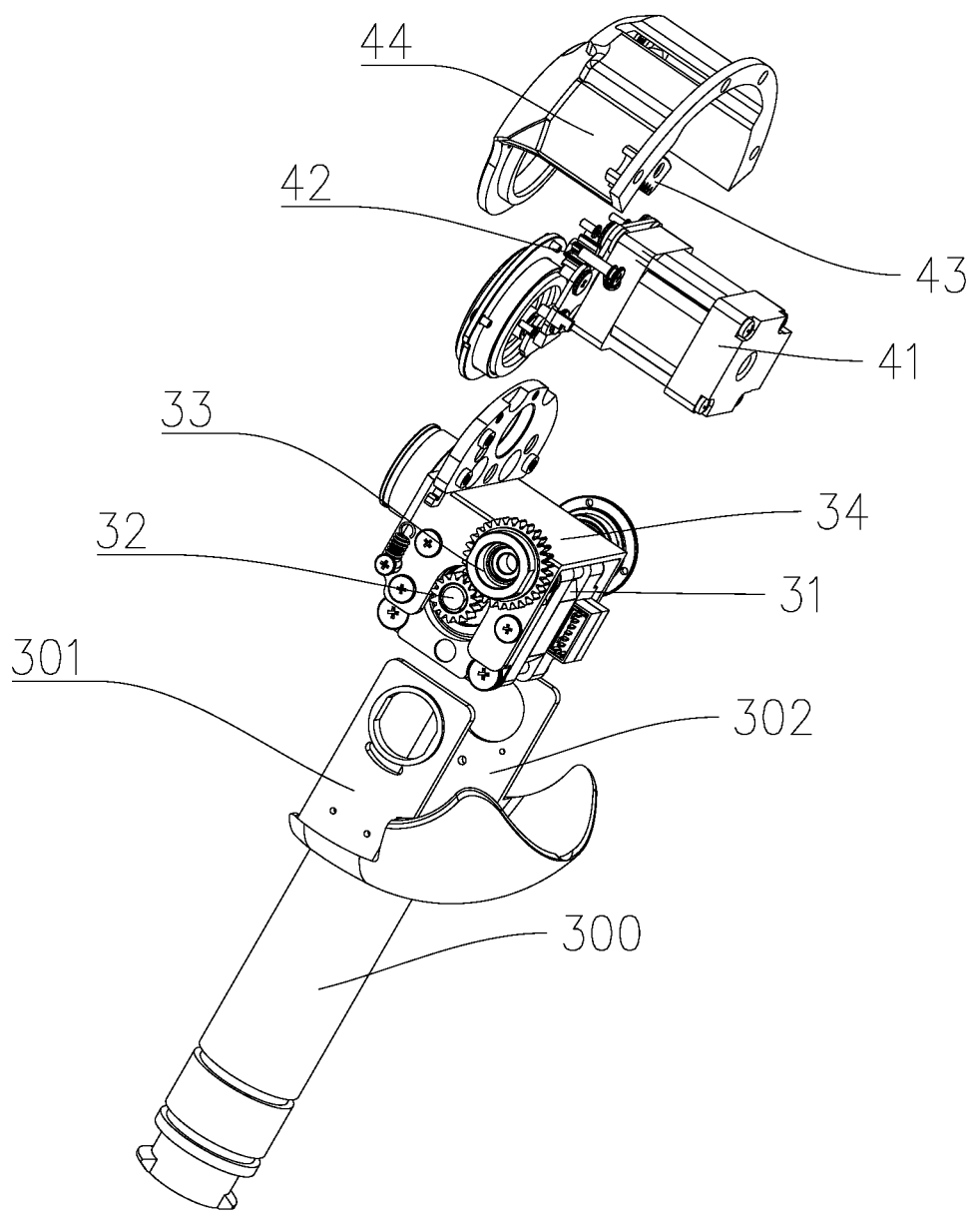
FIG. 4 is a schematic diagram of connection between a rotating shaft, a pitch module, and a swing module of the gimbal device of the present disclosure.

In view of above defects, the present disclosure provides a gimbal device. As shown in FIG. 1 to FIG. 4, the gimbal device includes a lifting module 100, a horizontal rotating module 200, a rotating shaft 300, a pitch module 400; and a swing module 500.

The lifting module 100 includes a first driving piece 11, a transmission worm 12 connected with an output end of the first driving piece 11, and a gear rack 13 disposed in a vertical direction. The transmission worm 12 is in transmission connection with the gear rack 13 to drive the gear rack 13 to move in the vertical direction.

The horizontal rotating module 200 is fixedly connected with the gear rack 13. The horizontal rotating module 200 includes a second driving piece 21, a first synchronous pulley 22 connected with an output end of the second driving piece 21, and a bearing assembly, an axial direction of the bearing assembly is parallel to the vertical direction. The first synchronous pulley 22 is in transmission connection with the bearing assembly to drive the bearing assembly to rotate in a horizontal direction.

The rotating shaft 300 is connected with the bearing assembly in the vertical direction. A pitch module 400 and a swing module 500 are disposed at an end portion of the rotating shaft 300.

The pitch module 400 includes a third driving piece 31, a first transmission gear 32 connected with an output end of the third driving piece 31, and a fixed gear 33 in transmission connection with the first transmission gear 32. An axis of the first transmission gear 32 is parallel to a first direction, and the fixed gear 33 is fixedly connected with the rotating shaft 300, so that the third driving piece 31 is rotatable around an axial direction of the fixed gear 33.

The swing module 500 includes a fourth driving piece 41, a second transmission gear 42 connected with an output end of the fourth driving piece 41, a swing gear 43 in transmission connection with the second transmission gear 42, and a swing housing 44 connected with the swing gear 43, an axis of the second transmission gear 42 is parallel to a second direction, and the fourth driving piece 41 drives the swing housing 44 to rotate around an axial direction of the swing gear 43.

In the above embodiment, the gimbal device provided in the present disclosure is configured to fix the target device or serve as an internal support structure of the target device. The horizontal rotating module 200, the pitch module 400, and the swing module 500 are all connected with the gear rack 13 of the lifting module 100, and the gear rack 13 is moveable in the vertical direction. That is, the target device is moveable in the vertical direction through the lifting module 100. The bearing assembly is engaged with the first synchronous pulley 22, enabling the bearing assembly being rotatable at a large angle, thus realizing a rotation of the target device in the horizontal direction through the horizontal rotating module 200. The axis of the first transmission gear 32 of the pitch module 400 is parallel to the first direction, so that when the third driving piece 31 is driven, by arrangement of the fixed gear 33, the third driving piece 31 is rotatable around the axial direction of the fixed gear 33 (i.e., the third driving piece 31 swings in a front-rear direction). That is, the target device is rotatable in the front-rear direction through the pitch module 400. The swing housing 44 is connected with the fourth driving piece 41 through the swing gear 43, so that when the fourth driving piece 41 rotates, the swing housing 44 rotates around the axial direction of the swing gear 43 (i.e., the swing housing 44 swings in a left-right direction). That is, the swing module 500 rotates the target device in the left-right direction through the swing module 500. Therefore, the gimbal device of the present disclosure is capable of performing four-axis motion, which enriches motion modes, is convenient to use, and improve user experience. Meanwhile, the lifting module 100, the horizontal rotating module 200, the pitch module 400, and the swing module 500 are disposed compactly, and do not affect each other during a working process, so that the four-axis motion of the gimbal device is realized in a small space and the gimbal device satisfies small volume requirements in multiple fields.

In one optional embodiment, the gimbal device of the present disclosure specifically includes a regulation module (i.e., the lifting module 100, the horizontal rotating module 200, the pitch module 400, and the swing module 500), a control module, and a protection module.

The protection module includes a bottom plate 700, a protective housing 600, and a top cover 800. The bottom plate 700 and the top cover 800 are respectively disposed on end openings of the protective housing 600. The protective housing 600, the top cover 800, and the bottom plate 700 enclose to form an accommodating space. The accommodating space is divided into a first accommodating cavity and a second accommodating cavity, the regulation module is disposed in the first accommodating cavity, and the control module is disposed in the second accommodating cavity. The control module includes a main control board and a driving board, and the main control board is electrically connected with the driving board. The main control board is configured to collect control commands of the gimbal device, convert the control commands into control signals, and transmit the control signals to the driving board. The driving board is electrically connected with the regulation module, so as to drive the regulation module to operate. It should be understood that the first accommodation cavity and the second accommodation cavity formed by the protection module prevents the regulation module and the control module from being damaged due to collision, and prolong service life of the gimbal device.

Further, the control commands are generated by function keys and a speed adjustment knob. The function key and the speed adjustment knob are disposed on a surface of the top cover 800, and both of the function keys and the speed adjustment knob are connected with the main control board. The function keys include a power switch, a module reset switch, a module automatic adjustment key, a horizontal rotation switch, a lifting switch, a left-right swing switch, and a front-rear pitch switch, that is, different control commands are generated by controlling different function keys.

Specifically, the gimbal device is turned on or turned off through the power switch, that is, the gimbal device is powered on or powered off through the power switch.

The module reset switch is configured to reset the lifting module 100, the horizontal rotating module 200, the pitch module 400, and the swing module 500 to reference positions after at least one angle adjustment has been performed.

The lifting module 100, the horizontal rotating module 200, the pitch module 400, and the swing module 500 are able to automatically run according to predetermined motion parameters of software by the module automatic adjustment key, thereby realizing automatic control of the gimbal device.

The horizontal rotation switch is configured to control rotation of the gimbal device in the horizontal direction, that is, when the horizontal rotation switch is turned on, the gimbal device is allowed to rotate in the horizontal direction, and when the horizontal rotation switch is turned off, the gimbal device is only allowed to perform adjustments on vertical movement, and/or left-right swinging, and/or front-rear pitching thereof.

The lifting switch is configured to control moving of the gimbal device in the vertical direction, that is, when the lifting switch is turned on, the gimbal device is allowed to move in the vertical direction, and when the lifting switch is turned off, the gimbal device is only allowed to perform adjustments on horizontal rotation, and/or left-right swinging, and/or front-rear pitching thereof.

The left-right swing switch is configured to control swing of the gimbal device in the left-right direction, that is, when the left-right swing switch is turned on, the gimbal device is allowed to swing in the left-right direction, and when the left-right swing switch is turned off, the gimbal device is only allowed to perform adjustments on horizontal rotation, and/or vertical movement, and/or front-rear pitching thereof.

The front-rear pitch switch is configured to control swing of the gimbal device in the front-rear direction, that is, when the front-rear pitch switch is turned on, the gimbal device is allowed to swing in the front-rear direction, and when the front-rear pitch switch is turned off, the gimbal device is only allowed to perform adjustments on horizontal rotation, and/or vertical movement, and/or left-right swinging thereof.

The speed adjustment knob is configured to control operation speeds of the gimbal horizontal rotating module 200, the pitch module 400, and the swing module 500. In the present disclosure, a lifting distance of the lifting module 100 is 0-27 mm, a rotation angle of the horizontal rotating module 200 is −180-180°, a rotation angle of the pitch module 400 is 0-50°, a rotation angle of the swing module 500 is −20-20°, and the operation speeds of the horizontal rotating module 200, the pitch module 400, and the swing module 500 are adjustable in a range of 0-270°/s.

It should be noted that the present disclosure defines reference positions of different component are different. For example, a reference surface of the lifting module 100 is a horizontal plane where a lower end of the gear rack 13 is located (when the lifting distance of the lifting module 100 is 0 mm), a reference surface of the horizontal rotating module 200 is an intermediate partition vertical plane of the gimbal device in the left-right direction when the gimbal device is in an initial position (when the rotation angle of the horizontal rotating module 200 is 00), a reference surface of the swing module 500 is the intermediate partition vertical plane of the gimbal device in the left-right direction when the gimbal device is in the initial position (when the swing module 500 is 0°), a reference surface of the pitch module 400 is an intermediate partition vertical plane of the gimbal device in the front-rear direction when the gimbal device is in the initial position (when the pitch module 400 is 0°).

Further, the protection module further includes an upper cover and a handle, and the upper cover covers a surface of the top cover 800 and is configured to protect the function keys and the direction adjustment knob from collision. The handle is disposed at a top of the upper cover or is disposed on a side surface of the protection housing 600, and the gimbal device is convenient to carry after the handle is disposed.

In one optional embodiment, the lifting module 100 is capable of controlling the gimbal device to move in the vertical direction. The lifting module 100 includes the first driving piece 11, the transmission worm 12, and the gear rack 13. The first driving piece 11 is electrically connected with the driving plate, so that the driving plate drives the first driving piece 11 to operate. The transmission worm 12 is connected with an output end of the first driving piece 11, so as to synchronously rotate with the first driving piece 11. In the present disclosure, teeth on the transmission worm 12 are helical teeth, the gear rack 13 is disposed in the vertical direction and is connected with the transmission worm 12. It should be understood that after the transmission worm 12 is in transmission connection with the gear rack 13 in the vertical direction, rotation motions of the first driving piece 11 are converted into linear motion in the vertical direction, so that the first driving piece 11 is able to drive the gear rack 13 to move in the vertical direction.

Further, the lifting module 100 further includes a transmission assembly, and the transmission worm 12 is in transmission connection with the gear rack 13 through the transmission assembly. The transmission assembly includes a third transmission gear 14 and a fourth transmission gear 15, and the third transmission gear 14 and the fourth transmission gear 15 rotate synchronously. The third transmission gear 14 is in transmission connection with the transmission worm 12, and the fourth transmission gear 15 is in transmission connection with the gear rack 13, so that the transmission worm 12 drives the gear rack 13 to move in the vertical direction. In the present disclosure, teeth on the third transmission gear 14 are helical teeth, the transmission worm 12 is of a multi-start type. It should be understood that by disposing of the transmission assembly, friction loss between the transmission worm 12 and the gear rack 13 may be reduced, and transmission efficiency is improved.

Furthermore, the lifting module 100 further includes a sensing assembly. The sensing assembly includes a photoelectric sensor 17 and light shielding sheets 16. The light shielding sheets 16 are respectively disposed at two ends of the gear rack 13. When the gear rack 13 moves in the vertical direction, the light shielding sheets 16 are in inductive connection with the photoelectric sensor 17. It should be understood that by arrangement of the sensing assembly, an uppermost position and a lowermost position of the gear rack 13 in the vertical direction are detected, and when the gear rack 13 reaches the uppermost position or the lowermost position, a corresponding one of the light shielding sheets 16 shields the photoelectric sensor 17, so that the gear rack 13 does not move any more, and the gear rack 13 is prevented from being unable to reset due to excessive movement.

Similarly, the protective housing 600 further includes a lifting bearing, and the lifting bearing is connected with the horizontal rotating module 200, so as to support the gimbal device during a lifting process, reduce friction between the gimbal device and the protective housing 600 during the lifting process, and reduce noise generated by the friction during the lifting process.

In one optional embodiment, the horizontal rotating module 200 is configured to control the gimbal device to rotate in the horizontal direction. The horizontal rotating module 200 includes the second driving piece 21, the first synchronous pulley 22, and the bearing assembly. The second driving piece 21 is electrically connected with the driving plate, so that the driving plate is able to drive the second driving piece 21 to operate. The first synchronous pulley 22 is connected with an output end of the second driving piece 21, so that the first synchronous pulley 22 rotates synchronously with the second driving piece 21. The bearing assembly includes a first bearing 231, a second bearing 232, a synchronous belt 233, and a second synchronous pulley 234. At least a part of the second bearing 232 is connected with the second synchronous pulley 234, at least a part of the first bearing 231 is connected with the second bearing 232, and the second synchronous pulley 234 is connected with the first synchronous pulley 22 through the synchronous belt 233, so that in a transmission process of the synchronous belt 233 and the second synchronous pulley 234, the first synchronous pulley 22 drives the second bearing 232 to rotate, thereby driving the first bearing 231 to rotate.

Further, the horizontal rotating module 200 further includes a gap spacer, and the gap spacer abuts against the second synchronous pulley 234 and the second bearing 232 to eliminate an assembly gap between the second synchronous pulley 234 and the second bearing 232.

In one optional embodiment, the rotating shaft 300 is disposed in a bearing hole of the first bearing 231, so as to rotate synchronously with the first bearing 231. The end portion of the rotating shaft 300 defines mounting positions, and the pitch module 400 and the swing module 500 are disposed on the rotating shaft 300 through the mounting positions.

In one optional embodiment, the pitch module 400 is capable of controlling the gimbal device to swing in the front-rear direction. The pitch module 400 includes the third drive piece 31, the first transmission gear 32, and the fixed gear 33. An axis of the first transmission gear 32 is parallel to the first direction, and the first transmission gear 32 is electrically connected with the driving plate, so that the driving plate is able to drive the third driving piece 31 to operate. The first transmission gear 32 is connected with an output end of the third driving piece 31, so that the first transmission gear 32 rotates synchronously with the third driving piece 31. The gimbal device further includes a first bracket 301 and a second bracket 302, the first bracket 301 and the second bracket 302 are oppositely disposed at an end portion of the rotating shaft 300 in the first direction, at least one of the first bracket 301 and the second bracket 302 defines a mounting hole, and the fixed gear is disposed in the at least one mounting hole. The pitch module 400 further includes a mounting housing 34, the third driving piece 31 is disposed in the mounting housing 34, and the first transmission gear 32 is disposed outside the mounting housing 34. The first transmission gear 32 is in transmission connection with the fixed gear 33, so that the third driving piece 31 in the mounting housing 34 is rotatable around an axis of the at least one mounting hole. It should be understood that when the third driving piece 31 swings in the front-rear direction, the target device is connected with the mounting housing 34, and the third driving piece 31 drives the target device to swing in the front-rear direction.

In one optional embodiment, the swing module 500 is capable of controlling the gimbal device to swing in the left-right direction. The swing module 500 includes the fourth driving piece 41, the second transmission gear 42 connected with an output end of the fourth driving piece 41, the swing gear 43 in transmission connection with the second transmission gear 42, and the swing housing 44 connected with the swing gear 43. The fourth driving piece 41 is electrically connected with the driving plate, so that the driving plate is able to drive the fourth driving piece 41 to operate. An axis of the second transmission gear 42 is parallel to the second direction, and the second transmission gear 42 is connected with the output end of the fourth driving piece 41, so that the second transmission gear 42 rotates synchronously with the fourth driving piece 41, the swing gear 43 rotates around its own axis, thereby driving the swing housing 44 to rotate around the axial direction of the swing gear 43, so that the target device is able to swing in the left-right direction.

In one optional embodiment, the first driving piece 11, the second driving piece 21, the third driving piece 31, and the fourth driving piece 41 are hybrid step motors. Alternatively, the first driving piece 11, the second driving piece 21, the third driving piece 31, and the fourth driving piece 41 may be other types of motors, which may be selected according to actual needs and are not limited herein.

In one optional embodiment, shock absorbing silicone structures are disposed between the first driving piece 11 and the protective housing 600, between the second driving piece 21 and the protective housing 600, between the third driving piece 31 and the protective housing 600, and between the fourth driving piece 41 and the protective housing 600. It should be understood that by arrangement of the shock absorbing silicone structures, influence of vibrations of the first driving piece 11, the second driving piece 21, the third driving piece 31, and the fourth driving piece 41 on control accuracy of the gimbal device is reduced.

In one optional embodiment, magnetic detection pieces are disposed on the horizontal rotating module 200, the pitch module 400, and the swing module 500. Angles of the horizontal rotating module 200, the pitch module 400, and the swing module 500 are measured through corresponding magnetic detection piece.

Further, a deceleration structure is disposed at a tail end of the second driving piece 21, and the deceleration structure limits an angle measurement range of the magnetic detection pieces to be reduced to below 360°, so as to prevent pointers of the magnetic detection pieces from excessively rotating (i.e., the pointers rotate more than one circle), so that angles of the magnetic detection pieces are not repeatedly measured. Further, after the gimbal device is powered off and then restarted, current positions of the pointers may also be recorded, thereby improving measurement accuracy of the magnetic detection pieces.

In one optional embodiment, the gimbal device further includes spring pieces. The spring pieces are respectively connected between the protective housing 600 and the first driving piece 11, between the protective housing 600 and the second driving piece 21, between the mounting housing 34 and the third driving piece 31, and between the mounting housing 34 and the fourth driving piece 41, so as to eliminate assembly gaps and prevent the first driving piece 11, the second driving piece 21, the third driving piece 31, and the fourth driving piece 41 from shaking.

The structures, features and effects of the present disclosure are described in detail above according to the embodiments shown in the drawings, which are merely some embodiments of the present disclosure, but the present disclosure is not limited to the implementation scope shown in the drawings, any changes made according to the concept of the present disclosure, or equivalent embodiments modified to equivalent changes, still do not exceed the spirit of the specification and the drawings, and shall fall within the protection scope of the present disclosure.

What is claimed is:

1. A gimbal device, comprising:
   a lifting module;
   a horizontal rotating module;
   a rotating shaft;
   a pitch module; and
   a swing module;
   wherein the lifting module comprises a first driving piece, a transmission worm connected with an output end of the first driving piece, and a gear rack disposed in a vertical direction; the transmission worm is in transmission connection with the gear rack to drive the gear rack to move in the vertical direction; the horizontal rotating module is fixedly connected with the gear rack;
   wherein the horizontal rotating module comprises a second driving piece, a first synchronous pulley connected with an output end of the second driving piece, and a bearing assembly connected by a synchronous belt to the first synchronous pulley, an axial direction of the bearing assembly is parallel to the vertical direction, and the first synchronous pulley is in transmission connection with the bearing assembly to drive the bearing assembly to rotate in a horizontal direction;

wherein the rotating shaft is connected with the bearing assembly in the vertical direction, the pitch module and the swing module are disposed at an end portion of the rotating shaft;

wherein the pitch module configured to rotate in a front-rear direction within a range of 0° to 50°, and the pitch module comprises a third driving piece, a first transmission gear connected with an output end of the third driving piece, and a fixed gear in transmission connection with the first transmission gear; an axis of the first transmission gear is parallel to the front-rear direction, and the fixed gear is fixedly connected with the rotating shaft, so that the third driving piece is rotatable around an axial direction of the fixed gear;

wherein the swing module configured to rotate in a left-right direction within a range of –20° to 20°, and the swing module comprises a fourth driving piece, a second transmission gear connected with an output end of the fourth driving piece, a swing gear in transmission connection with the second transmission gear, and a swing housing connected with the swing gear, an axis of the second transmission gear is parallel to the left-right direction, and the fourth driving piece drives the swing housing to rotate around an axial direction of the swing gear.

2. The gimbal device according to claim 1, wherein the lifting module further comprises a transmission assembly, and the transmission worm is in transmission connection with the gear rack through the transmission assembly, the transmission assembly comprises a third transmission gear and a fourth transmission gear, and the third transmission gear and the fourth transmission gear rotate synchronously, the third transmission gear is in transmission connection with the transmission worm, and the fourth transmission gear is in transmission connection with the gear rack, so that the first driving piece drives the gear rack to move in the vertical direction.

3. The gimbal device according to claim 1, wherein the lifting module further comprises a sensing assembly, the sensing assembly comprises a photoelectric sensor and light shielding sheets, the light shielding sheets are respectively disposed at two ends of the gear rack, and when the gear rack moves in the vertical direction, the light shielding sheets are in inductive connection with the photoelectric sensor.

4. The gimbal device according to claim 1, wherein the bearing assembly comprises a first bearing, a second bearing, and a second synchronous pulley, at least a part of the second bearing is connected with the second synchronous pulley, at least a part of the first bearing is connected with the second bearing, and the second synchronous pulley is connected with the first synchronous pulley through a synchronous belt.

5. The gimbal device according to claim 1, wherein the gimbal device further comprises a first bracket and a second bracket, the first bracket and the second bracket are oppositely disposed at the end portion of the rotating shaft in the first direction, at least one of the first bracket and the second bracket defines a mounting hole, and the fixed gear is disposed in the mounting hole;

the pitch module further comprises a mounting housing, the third driving piece is disposed in the mounting housing, the first transmission gear is disposed outside the mounting housing, and the first transmission gear is in transmission connection with the fixed gear, so that the third driving piece in the mounting housing is rotatable around an axis of the mounting hole.

6. The gimbal device according to claim 1, wherein the first driving piece, the second driving piece, the third driving piece, and the fourth driving piece are hybrid step motors.

7. The gimbal device according to claim 6, wherein the gimbal device comprises a protective housing, shock absorbing silicone structures are disposed between the first driving piece and the protective housing, between the second driving piece and the protective housing, between the third driving piece and the protective housing, and between the fourth driving piece and the protective housing.

8. The gimbal device according to claim 1, wherein magnetic detection pieces are disposed on the horizontal rotating module, the pitch module, and the swing module.

9. The gimbal device according to claim 1, wherein the gimbal device further comprises a control module, the control module comprises a main control board and a driving board, the main control board is electrically connected with the driving board, and the driving board is electrically connected with the first driving piece, the second driving piece, the third driving piece, and the fourth driving piece.

10. The gimbal device according to claim 1, wherein the gimbal device comprises at least one of following features:

(1) a lifting distance of the lifting module is 0-27 mm;

(2) a rotation angle of the horizontal rotating module is –180-180°;

(3) a rotation angle of the pitch module is 0-50°;

(4) a rotation angle of the swing module is –20-20°;

(5) operating speeds of the horizontal rotating module, the pitch module, and the swing module is adjustable in a range of 0-270°/s.

* * * * *